United States Patent
Farrugia et al.

(10) Patent No.: US 9,424,049 B2
(45) Date of Patent: Aug. 23, 2016

(54) DATA PROTECTION FOR OPAQUE DATA STRUCTURES

(75) Inventors: Augustin J. Farrugia, Los Altos Hills, CA (US); Daniel F. Reynaud, Mountain View, CA (US); Gianpaolo Fasoli, Redwood City, CA (US); Jonathan Gregory McLachlan, San Francisco, CA (US); Julien Lerouge, San Jose, CA (US)

(73) Assignee: Apple Inc., Cupertino, CA (US)

( * ) Notice: Subject to any disclaimer, the term of this patent is extended or adjusted under 35 U.S.C. 154(b) by 242 days.

(21) Appl. No.: 13/615,974

(22) Filed: Sep. 14, 2012

(65) Prior Publication Data

US 2013/0232507 A1 Sep. 5, 2013

Related U.S. Application Data

(60) Provisional application No. 61/606,233, filed on Mar. 2, 2012.

(51) Int. Cl.
*G06F 9/54* (2006.01)
*G06F 9/44* (2006.01)
*G06F 21/14* (2013.01)
*G06F 21/52* (2013.01)

(52) U.S. Cl.
CPC ............. *G06F 9/4423* (2013.01); *G06F 21/14* (2013.01); *G06F 21/52* (2013.01)

(58) Field of Classification Search
None
See application file for complete search history.

(56) References Cited

U.S. PATENT DOCUMENTS

| | | | |
|---|---|---|---|
| 5,815,574 A | 9/1998 | Fortinsky | |
| 7,441,116 B2 | 10/2008 | Cheng | |
| 7,603,553 B1* | 10/2009 | Corbett ............. | G06F 17/30197 707/999.001 |
| 7,752,459 B2 | 7/2010 | Cowan et al. | |
| 8,015,214 B2 | 9/2011 | Coker | |
| 8,024,563 B1* | 9/2011 | Belgaied et al. ............. | 713/164 |
| 8,095,957 B2 | 1/2012 | Cotarmanac'h | |
| 2003/0182572 A1 | 9/2003 | Cowan et al. | |
| 2004/0024857 A1 | 2/2004 | Cai | |
| 2005/0050004 A1* | 3/2005 | Sheu et al. ........................ | 707/1 |
| 2005/0268067 A1* | 12/2005 | Lee et al. ...................... | 711/202 |

(Continued)

FOREIGN PATENT DOCUMENTS

EP 0 816 969 A2 1/1998

OTHER PUBLICATIONS

PCT International Search Report and Written Opinion for corresponding International Application No. PCT/US2013/028023, mailing date Jun. 25, 2013, 9 pages.

(Continued)

*Primary Examiner* — Umut Onat
(74) *Attorney, Agent, or Firm* — Blakely, Sokoloff, Taylor & Zalman LLP (57) ABSTRACT

Methods, media and systems that use an encoded opaque pointer in an API between a client process and a library process. An encoded opaque pointer, in one embodiment, can be received by the library process from the client process, and the library process can decode the opaque pointer to obtain an address in memory containing a data structure pointed to by the opaque pointer. The library process can operate on the data structure to create a revised or processed data structure, stored in the same or different address in heap memory or stack memory, and the library process can encode and return a new opaque pointer, for the processed data structure, to the client process.

25 Claims, 7 Drawing Sheets

(56) References Cited

U.S. PATENT DOCUMENTS

2009/0037725 A1* 2/2009 Farrugia et al. ............. 713/155
2010/0106920 A1* 4/2010 Anckaert et al. ............. 711/154
2011/0167407 A1 7/2011 Betouin et al.
2012/0054719 A1 3/2012 Spooren et al.

OTHER PUBLICATIONS

PCT International Preliminary Report on Patentability for PCT/US2013/028023, mailed Sep. 12, 2014.

* cited by examiner

DATA PROTECTION FOR OPAQUE DATA STRUCTURES

CROSS-REFERENCE TO RELATED APPLICATIONS

This application claims the benefit of U.S. Provisional Application No. 61/606,233, filed Mar. 2, 2012, which is hereby incorporated by reference.

BACKGROUND OF THE INVENTION

The present invention relates to the field of methods for protecting data used in a data processing system, such as a computer.

In computer programming, an opaque pointer is a special case of an opaque data type which is a data type that is declared to be a pointer to a record or data structure of some unspecified type. Opaque pointers are often used in computer programs to hide implementation details. For example, a client software process which is communicating with a library might establish a session by calling an API (application programming interfaces) that will send back an opaque pointer to the client process. The opaque pointer can be used in subsequent calls to identify the client from the standpoint of the library and can be used to refer to or point to the data structure which can be manipulated by the library. Opaque pointers provide a way to hide the implementation details of an interface from a client process so that the implementation can be changed without the need to recompile the modules using the implementation.

APIs using opaque pointers are often targeted by attackers that might attempt to reverse engineer the opaque data structure. Once the opaque data structure is understood, attackers can intercept the data, modify it or even replay data previously observed. Hence, an improved method for using opaque pointers may be desirable.

SUMMARY OF THE DESCRIPTION

Methods, machine-readable non-transitory storage media and systems that use an encoded opaque pointer in an API between a client process and a library process are described. In one embodiment, an encoded opaque pointer can be received by the library process from the client process, and the library process can decode the opaque pointer to obtain an address in memory containing a data structure pointed to by the opaque pointer. The library process can operate on the data structure to create a revised or processed data structure, and then the library process can encode and return a new opaque pointer, corresponding to the processed data structure, to the client process. In one embodiment, the data structure can be stored at an address in heap memory or in stack memory of the library process. In one embodiment, the encoding of the opaque pointer can include the use of selected portions of text of the executable code, in binary opcode form, of the library process, and this representation of text can be used as a variable in the encoding of the opaque pointer. In this way, the opaque pointer is associated with or tied to the particular library code used in the encoding process, and it will be difficult for an attacker to reverse engineer the encoding process, particularly if the selection of the text of the binary code is random. In one embodiment, the text can be from a portion of the library process while in another embodiment the text can be from a portion of the client process or a combination of both the library process and the client process.

The encoding of an opaque pointer can be performed in a layered or repetitive fashion. For example, the encoding can be performed by using a series of encoding operations in which an output from a first encoding operation is used as an input to a next encoding operation in order to apply multiple layers of encoding to the opaque pointer.

The encoding of the opaque pointer can also use one or more constants in the executable code of the library process as variables in the encoding of the opaque pointer. Moreover, the encoding of the opaque pointer can use a representation of a pointer value, which corresponds to one or more addresses of the data structure used by the library process as part of the API. This pointer value can be used as a variable in the encoding of the opaque pointer in one embodiment. Moreover, in one embodiment, the encoding can also use a representation of the data structure itself as a variable in the encoding process for encoding an opaque pointer.

In one embodiment the encoding of the opaque pointer can be performed by calculating an encryption function with a key and variables. The key can be a fixed cryptographic key or a concatenation of a set of the variables used in the encryption function, such as a representation of text of the executable code in the library process and one or more constants in the executable code and a representation of the data structure and a representation of the pointer value which points to the data structure.

The encoding operations effectively scramble, in one embodiment, the pointer and the data that is pointed to in such a way that running the same client process with the same library in two identical environments will generate two different scramblings or encodings; in this fashion, the encoding process is non-deterministic. Moreover, in one embodiment, running the same client process with the same library process several times in a row in a single environment can, in one embodiment, generate different encodings or scramblings each time; in other words, the encoding can be dynamic. In one embodiment, the encoding operation can depend on static information embedded in the library program at compilation time. Moreover, the encoding operation can depend upon constant data embedded in the program so that altering those constants will result in a different encoding result.

In one embodiment, an attempt to circumvent the protection provided by this encoded opaque pointer can be provided by detecting a modified encoded opaque pointer which has been modified by an attacker. In one embodiment, a simple checksum mechanism can be used to detect buffer corruption which indicates that a hacker has modified an opaque pointer. In response to detecting this modification, defensive mechanisms can be taken such as crashing the library program or corrupting data or blacklisting the client, etc., depending on the context and seriousness of the security breach.

Other features of the present invention will be apparent from the accompanying drawings and from the detailed description which follows.

The above summary does not include an exhaustive list of all aspects of the present invention. It is contemplated that the invention includes all systems and methods that can be practiced from all suitable combinations of the various aspects summarized above, and also those disclosed in the Detailed Description below.

BRIEF DESCRIPTION OF THE DRAWINGS

The present invention is illustrated by way of example, and not limitation, in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details we not described in order to provide a concise discussion of embodiments of the present invention.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

An API and/or a library process can be protected through the use of one or more encoded opaque pointers which are exchanged to cross the API between a client process and a library process. The encoding of an opaque pointer can be considered to be a seal applied to the opaque pointer, and the seal helps to protect the opaque pointer from attack by hackers or others attempting to reverse engineer the API or the library process.

Figure 1:
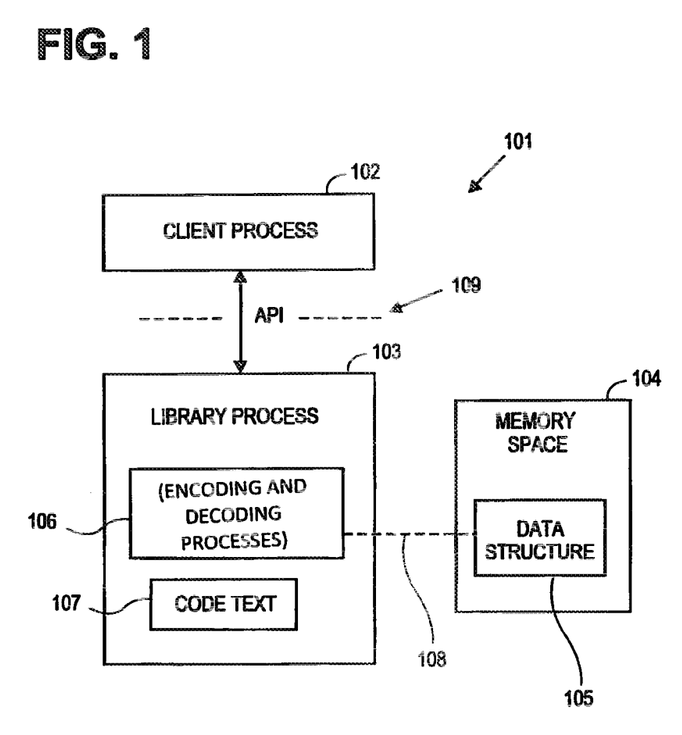
FIG. 1 shows an example of an API between a client process and a library process in which an encoded opaque pointer is used.

FIG. 1 shows an example of a software architecture 101 which includes a client process 102 and a library process 103. The software architecture 101 can be implemented on a data processing system such as the system shown in FIG. 5. Calls and returns to calls are exchanged between client process 102 and library process 103 through the API 109. One or more encoded opaque pointers are passed or exchanged through API 109 in one embodiment of the present invention. Client process 102 can be an application program or a user program or other software applications which can be configured to make calls to one or more libraries, such as a library which implements a library process 103. Library process 103 can be one or more processes provided by a software library which can be a set of software routines or a software framework or other known mechanisms for creating a library that can provide software routines in response to calls from other software components, such as client process 102. Library process 103 can operate in a memory space 104 which includes a data structure 105 stored at an address specified by a pointer 108. The pointer can be a logical address or a physical address of the memory containing data structure 105 in memory space 104. Memory space 104 in one embodiment can be in heap memory, which can be provided in response to a Malloc call; in another embodiment, memory space 104 can be part of a stack memory for library process 103.

Library process 103 includes executable binary codes in the form of text which can represent binary opcodes for the software of the library process. This text, referred to as code text 107 can be used in one embodiment as part of the encoding process, and this is described further below in conjunction with FIG. 4 (for example). Library process 103 can include software which implements encoding and decoding processes 106. The encoding and decoding processes 106 are used to encode and decode one or more opaque pointers according to one embodiment of the present invention. Library process 103 can also include constants, such as fixed integer or floating point values which are embedded in the library process either when the software for library process 103 is written or at compilation time.

Figure 2:
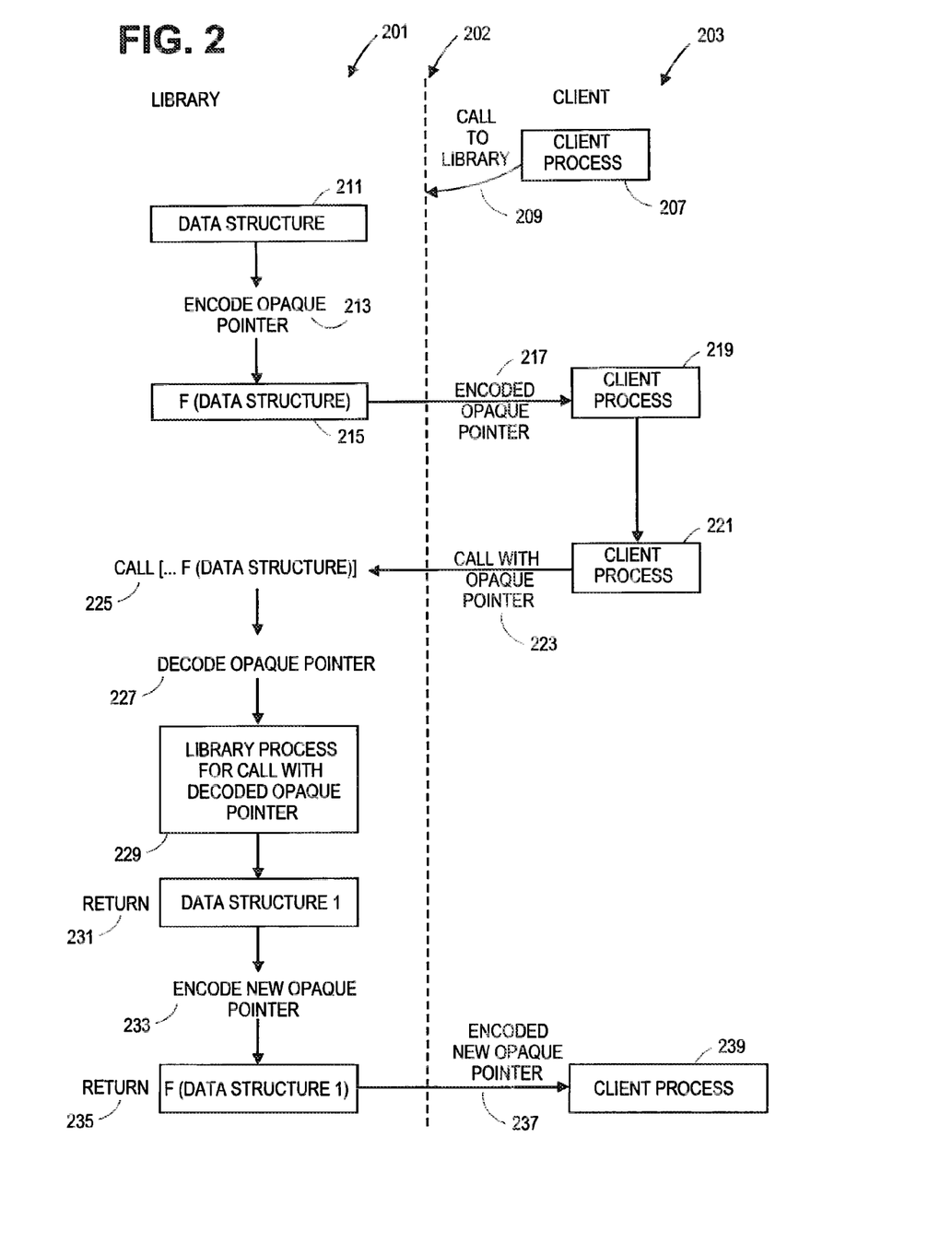
FIG. 2 shows an example of a process for using an encoded opaque pointer in the context of an API between those processes.

FIG. 2 shows an example of an interaction between one or more client processes and one or more library processes over time according to one embodiment of the present invention. An API 202 exists between one or more client processes 203 and one or more library processes 201. Library process 201 can be the same as library process 103 in FIG. 1 and client process 203 can be the same as client process 102 in FIG. 1. Similarly, API 202 can be the same as API 109 shown in FIG. 1. In one embodiment, client process 207 can make a call to library 209 through API 202. This call can cause the creation of data structure 211 by library process 201. Data structure 211 can correspond to data structure 105 shown in FIG. 1. The address of the data in data structure 211 is provided by a pointer, such as pointer 108 shown in FIG. 1. Library process 201 then encodes an opaque pointer 213 through an encoding function to provide an encoded opaque pointer 215 which is then returned in return 217 to client process 219 through API 202. Client process 221 can then operate within its process and then later make a call 223 with the opaque pointer which is encoded and was provided in return 217. The library process 201 receives the call 225 and decodes the opaque pointer 227. In one embodiment, the decode operation can be a cryptographic decode operation which uses a symmetric key (that was used to encode the encoded opaque pointer) to decode the opaque pointer and thereby retrieve the inputs to the encoding operation; the pointer to data structure 211 can be one of those inputs. At this point, the library process can operate on the call with the decoded opaque pointer 229. This can result in a processed data structure (shown as "data structure 1") which is prepared for return 231. Prior to the return however, the new opaque pointer is encoded in operation 233 to provide the return 235 which provides a new encoded opaque pointer 237 to client process 239. In one embodiment, the encoded opaque pointer 237 can be different than encoded opaque pointer 217; this difference can be due to changes in the data structure or pointer value or the selection of different portions of code text or constants embedded in the library process or the use of different keys or any combination of these different items.

Figure 3:
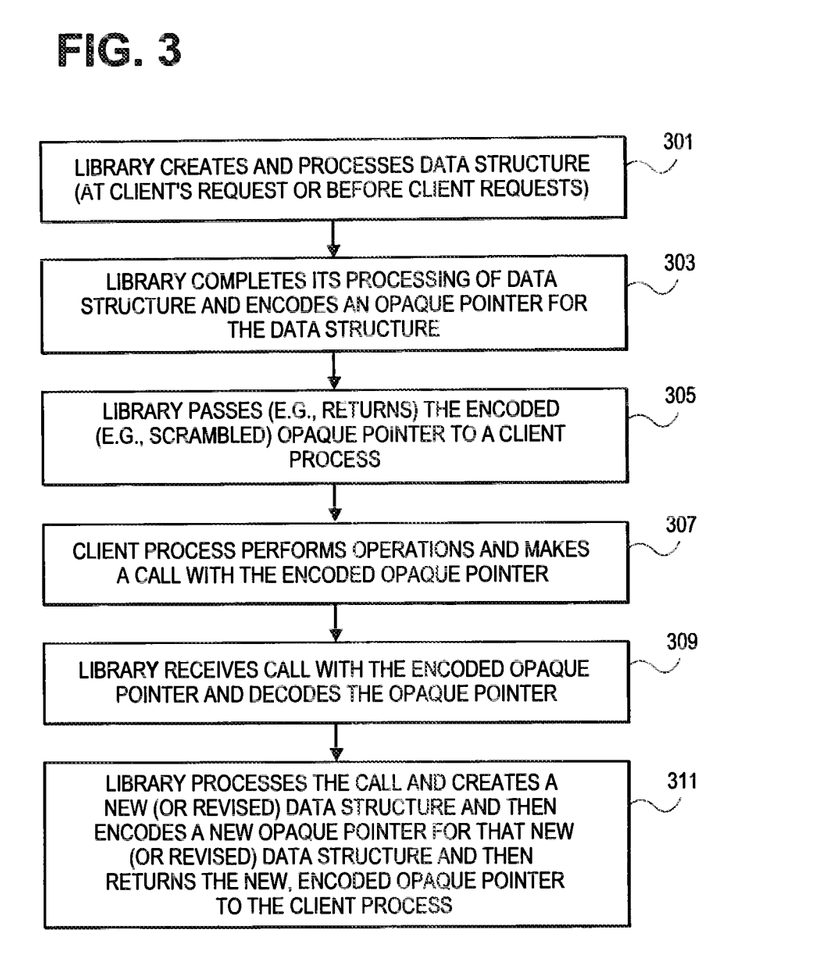
FIG. 3 is a flowchart which illustrates a method according to one embodiment of the present invention.

FIG. 3 shows an example of a method performed by a library process according to one embodiment of the present invention. In operation 301, the library process can create and process a data structure which can be used in conjunction with a client process through, for example, a call by the client process. The data structure can be created at the client's request through a call or before the client makes a call. The data structure created in operation 301 can be data structure 211 shown in FIG. 2. In operation 303, the library can complete its processing of the data structure and encode an opaque pointer for the data structure; encoded opaque pointer 217 can be an example of an encoded opaque pointer created by operation 303. In operation 305, the library passes the encoded opaque pointer to a client process; this can be through a return operation in response to a prior call from the client process. Then in operation 307, the client process can perform one or more operations; these operations can include the use of data provided with the opaque pointer. The client process in operation 307 then makes a call with the encoded opaque pointer to the library process which is received in operation 309 by the library process. In operation 309, the library process decodes the opaque pointer to yield a decoded opaque pointer which can be used in the library process such as process 229 shown in FIG. 2. In operation 311, the library can process the call received in operation 309 and create a new or revised data structure in response to the call and then can encode a new opaque pointer for that new or revised data structure which then can be returned to the client process.

Figure 4:
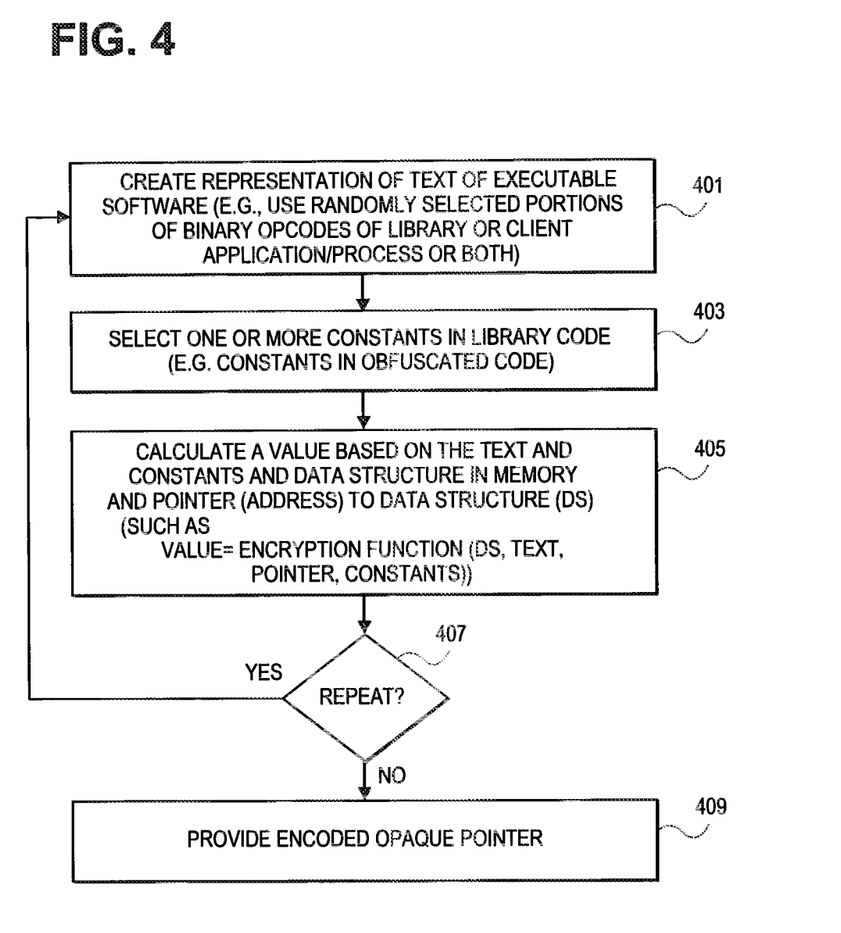
FIG. 4 shows a flowchart which illustrates one embodiment of a method for encoding an opaque pointer.

FIG. 4 shows a particular example of a method for encoding an opaque pointer. This method can be performed as part of operation 303 as shown in FIG. 3. It will be appreciated that there are many alternative embodiments for encoding an opaque pointer which use different functions, different variables, or different sets of variables, etc.; hence it will be understood that FIG. 4 merely represents one example out of many possible alternative embodiments for encoding an opaque pointer. The method shown in FIG. 4 can be performed by the encoding and decoding processes 106 shown in FIG. 1 which is part of a library process; in another embodiment, the encoding and decoding processes can be performed by another software component through a call from the library process to another software component. The method shown in FIG. 4 can begin in operation 401 by creating a representation of text of executable software, such as a randomly selected portion of binary opcodes of the library process. In another embodiment, the selections of portions of text of the code can be code from the library process or a combination of the library process's code and the library client process's code. For example operation 401 can randomly select some number of values from the binary opcodes of the library process; those values can be hashed by a conventional hash function or processed in some other way to reduce the size of the data in one embodiment. The resulting representation of text can then be used in an encoding function, such as the encoding function described in conjunction with operation 405 in FIG. 4. Operation 403 can include the selection of one or more constants which have been embedded in the library code. The constants can be embedded in obfuscated code which can be obfuscated using techniques known in the art. Operation 403 can be performed before operation 401 in one embodiment. Operation 403, like operation 401, is used to create inputs to the encoding function used in operation 405. In operation 405, a value is calculated based upon the inputs which can include the text representation created in operation 401 and the constant selected in operation 403, Further, the inputs to the encoding function can include data selected from the data structure in memory, such as data structure 105 or data structure 211, and the inputs to the function can also include a pointer value or a portion of the pointer value to the data structure. The value can be calculated by using a conventional encryption function which uses the four inputs shown in operation 405 and uses either a fixed symmetric key or a set of asymmetric keys or a key which is derived from a concatenation of a set of inputs, such as a concatenation of the text input and the pointer input or a concatenation of the constants input and the data structure, or other concatenations using any combination of the inputs. The encryption function can be the Advanced Encryption Standard (AES) encryption method or other known encryption algorithms. The value created by the encoding function in operation 405 can be used as the encoded opaque pointer in operation 409 if the process is not repeated by virtue of the decision operation 407. If the process is repeated through the decision block 407, then processing can return to operation 401 which repeats the encoding operation to derive a second value. The second value can be concatenated or combined in some way with a prior value. The repeating of the encoding process effectively applies the seal multiple times and can allow for the seal to be layered multiple times to create added security.

The implementation of an encoding process as shown in FIG. 4 can provide a variety of advantages. For example, naming the same client process with the same library process in two identical environments can generate two different encoded opaque pointers by virtue of using randomly selected portions of binary opcodes of the library process and randomly selecting constants in the library code, etc. Running the same client process with the same client library several times in a row in a single environment can generate different encoded opaque pointers each time. This can also result from the use of random selections of code portions or random selection of constants in the code library, or different positions of the pointer or differences in the data structures over time. Hence, the encoded opaque pointer can be non-deterministic and also dynamic over time. Further, encoded opaque pointers applied to two unrelated opaque data structures can be different; this can be due to the fact that the encoding depends on static information embedded in the library process at compilation time. Also, the encoding can depend upon constant data embedded in the library process so that altering those constants will result in a different encoding being applied. As noted previously, the encoding can be applied or removed multiple times in reversible manner and be layered multiple times. The layering may be particularly helpful to ensue that certain paths are indeed executed. For example, if you want to ensure both foo and bar are invoked, and not just bar, then, ptr=getPtr( )<--applies seal1 and seal2 to ptr, in that order.
foo(ptr)<--removes seal2 from ptr
bar(ptr)<--removes seal1 from ptr, and performs operations on ptr So, with this scheme, it would be impossible for a dynamic adversary to force execution of only bar, without first executing foo, which provides a way to detect malicious modification of control flow.

The decoding operations, which decode the encoded opaque pointers, can be simple decryption algorithms that use a symmetric key to reverse the encryption algorithm and thereby reveal the inputs which can include the pointer value.

Figure 5:
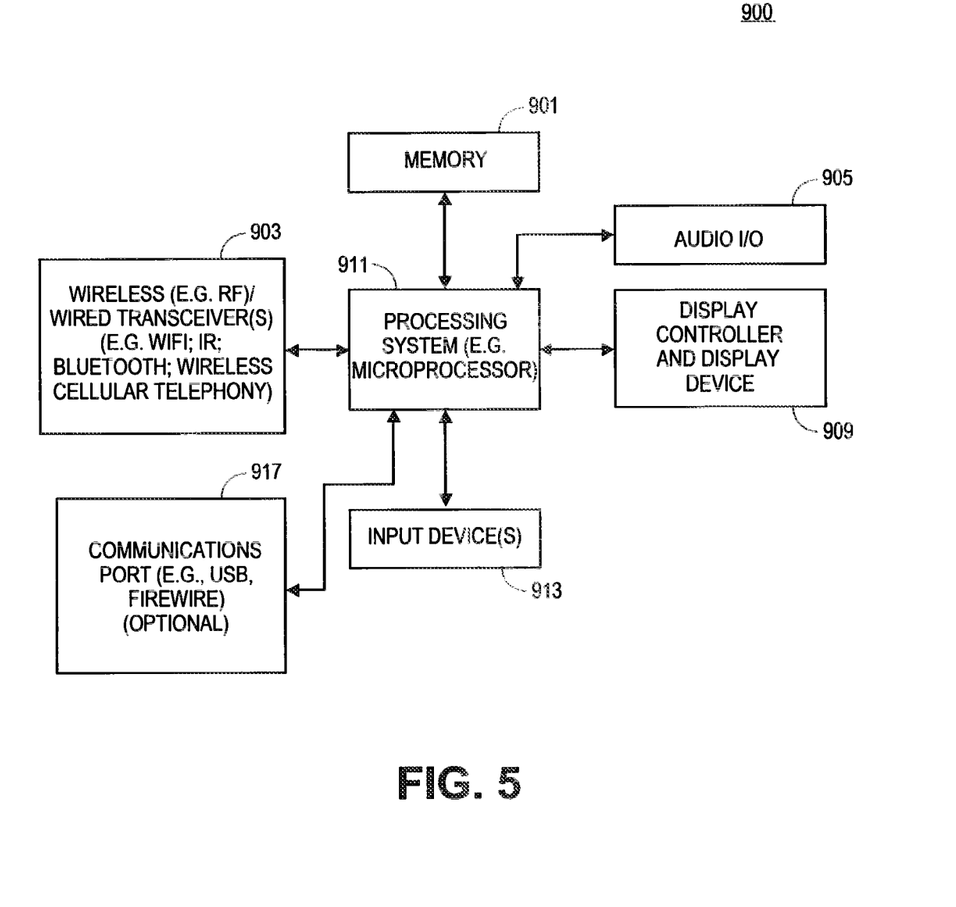
FIG. 5 shows an example of a data processing system which may be used with one or more embodiments described herein.

FIG. 5 shows an example of data processing system 900 which may be used with one embodiment of the present invention. For example and in one embodiment, system 900 may be implemented as a portable data processing device such as a smartphone (e.g., iPhone®) or tablet (e.g., iPad®) device or a laptop or an entertainment system. The data processing system 900 shown in FIG. 5 includes a processing system 911, which may be one or more microprocessors or which may be a system on a chip (integrated circuit) and the system also includes memory 901 for storing data and programs for execution by the processing system. The memory 901 can store, for example, the software components described in conjunction with FIG. 1 and memory 901 can be any known form of a machine readable non-transitory storage medium, such as semiconductor memory (e.g., flash; DRAM; SRAM; etc.) The system 900 also includes an audio input/output subsystem 905 which may include a microphone and a speaker for, for example, playing back music or providing telephone functionality through the speaker and microphone.

A display controller and display device 909 can provide a visual user interface for the user; this interface may include a graphical user interface which is similar to that shown on a Macintosh® computer when running OS X operating system software or iOS software on an iPhone® or iPad®. The system 900 also can include one or more wireless transceivers 903 to communicate with another data processing system. A wireless transceiver may be a WLAN transceiver (e.g. WiFi), an infrared transceiver, a Bluetooth® transceiver, and/or a wireless cellular telephony transceiver. It will be appreciated that additional components, not shown, may also be part of the system 900 in certain embodiments. and in certain embodiments fewer components than shown in FIG. 5 may also be used in a data processing system. The system 900 further can include one or more communications ports 917 to communicate with another data processing system. The communications port may be a USB port, Firewire port, Bluetooth® interface, a docking port, etc.

The data processing system 900 also can include one or more input devices 913 which are provided to allow a user to provide input to the system. These input devices may be a keypad or a keyboard or a touch panel or a multi-touch panel which is overlaid and integrated with a display device such as display device 909. The data processing system 900 can also include an optional input/output device which may be a connector for a dock. It will be appreciated that one or more buses, not shown may be used to interconnect the various components as is well known in the art. The data processing system shown in FIG. 5 may be a desktop computer, a handheld computer or a personal digital assistant (PDA), or a cellular telephone with PDA-like functionality, or a handheld computer which includes a cellular telephone, or a media player, such as an iPod®, or a game or entertainment device, or devices which combine aspects or functions of these devices, such as a media player combined with a PDA and a cellular telephone in one device or an embedded device or other consumer electronic devices. In other embodiments, the data processing system 900 may be a network computer or an embedded processing device within another device, or other types of data processing systems which have fewer components or perhaps more components than that shown in FIG. 5.

Data processing system 900 can optionally include one or more hardware devices designed to digitize and store human speech received by the microphone in Audio I/O 905.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

Examples of a portable media player are described in published U.S. Pat. No. 7,345,671 and U.S. published patent application number 2004/0224638, both of which are incorporated herein by reference.

One or more Application Programming Interfaces (APIs) may be used in some embodiments. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control Information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other Item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in pet on the hardware component.

The API-calling component may be a local component (i.e., on the same data processing system as the API-implementing component) or a remote component (i.e. on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embodiment, call APIs from different providers such as a set of APIs from an OS provider and another set of APIs from a plug-in provider and another set of APIs from another provider (e.g. the provider of a software library) or creator of the another set of APIs.

Figure 6:
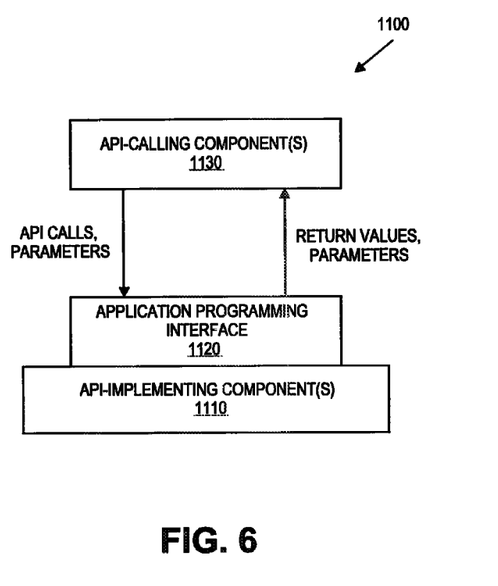
FIG. 6 is a block diagram illustrating an exemplary API architecture which may be used in some embodiments of the present invention.

FIG. 6 is a block diagram illustrating an exemplary API architecture, which may be used in some embodiments of the invention. As shown in FIG. 6, the API architecture 1100 includes the API-implementing component 1110 (e.g., an operating system, a library, a device driver, an API, an application program, software or other module) that implements the API 1120. The API 1120 specifies one or more functions, methods, classes, objects, protocols, data structures, formats and/or other features of the API-implementing component that may be used by the API-calling component 1130. The API 1120 can specify at least one calling convention that specifies how a function in the API-implementing component receives parameters from the API-calling component and how the function returns a result to the API-calling component. The API-calling component 1130 (e.g., an operating system, a library, a device driver, an API, an application program, software or other module), makes API calls through the API 1120 to access and use the features of the API-implementing component 1110 that are specified by the API 1120. The API-implementing component 1110 may return a value through the API 1120 to the API-calling component 1130 in response to an API call.

It will be appreciated that the API-implementing component 1110 may include additional functions, methods, classes, data structures, and/or other features that are not specified through the API 1120 and are not available to the API-calling component 1130. It should be understood that the API-calling component 1130 may be on the same system as the API-implementing component 1110 or may be located remotely and accesses the API-implementing component 1110 using the API 1120 over a network. While FIG. 6 illustrates a single API-calling component 1130 interacting with the API 1120, it should be understood that other API-calling components, which may be written in different languages (or the same language) than the API-calling component 1130, may use the API 1120.

The API-implementing component 1110, the API 1120, and the API-calling component 1130 may be stored in a machine-readable non-transitory storage medium, which includes any mechanism for storing information in a tangible form readable by a machine (e.g., a computer or other data processing system). For example, a machine-readable medium includes magnetic disks, optical disks, random access memory; read only memory, flash memory devices, etc. and can be a local storage medium or a storage medium on a remote device that is coupled to a client device by one or more networks.

Figure 7:
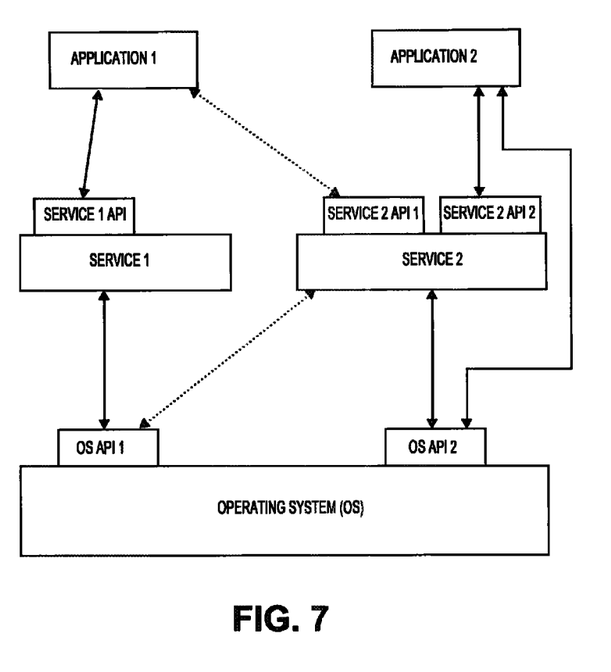
FIG. 7 is an example of a software stack that may be used in some embodiments of the present invention.

In FIG. 7 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A machine readable non-transitory storage medium containing executable instructions which when executed by a data processing system cause the data processing system to perform a method comprising:
   receiving, at a library process, a first encoded opaque pointer from a client process;
   decoding, in the library process, the first encoded opaque pointer to derive a first address in memory for data in a data structure;
   processing, in the library process, the data structure to create a processed data structure;
   generating and encoding, in the library process, a second opaque pointer to reference the processed data structure, wherein the first opaque pointer and second opaque pointer are different from one another and the first opaque pointer and second opaque pointer are both generated by the same library process on the same data processing system; and
   returning to the client process the second opaque pointer.

2. The medium as in claim 1 wherein the encoding of the second opaque pointer comprises deriving a representation of text of executable code in the library process and using the representation of text as a variable in the encoding of the second opaque pointer.

3. The medium as in claim 1 wherein the encoding of the second opaque pointer comprises obtaining a representation of text of executable code in the client process and using the representation of text as a variable in the encoding of the second opaque pointer.

4. The medium as in claim 1 wherein the first opaque pointer is created in an encoding process by the library process.

5. The medium as in claim 1 wherein the encoding of the second opaque pointer comprises performing a series of encoding operations in which an output from one encoding operation is used as an input to a next encoding operation.

6. The medium as in claim 1 wherein the encoding of the second opaque pointer comprises using one or more constants in executable code in the library process as variables in the encoding of the second opaque pointer.

7. The medium as in claim 1 wherein the encoding of the second opaque pointer comprises using a representation of a pointer value, corresponding to the first address, as a variable in the encoding of the second opaque pointer.

8. The medium as in claim 1 wherein the encoding of the second opaque pointer comprises using a representation of the processed data structure as a variable in the encoding of the second opaque pointer.

9. The medium as in claim 1 wherein the encoding of the second opaque pointer comprises calculating an encryption function with a key and variables, wherein the variables comprise a representation of text of executable code in the library process and a representation of the processed data structure; and wherein the key is a concatenation of a representation of selected text of executable code in the library process and a representation of the pointer value.

10. The medium as in claim 9 wherein the representation of text is randomly selected, and wherein the encoding is nondeterministic and dynamic.

11. A machine implemented method practiced on a data processing system, the method comprising:
    receiving, at a library process, a first encoded opaque pointer from a client process;
    decoding, in the library process, the first encoded opaque pointer to derive a first address in memory for data in a data structure;
    processing, in the library process, the data structure to create a processed data structure;
    generating and encoding, in the library process, a second opaque pointer to reference the processed data structure, wherein the first opaque pointer and second opaque pointer are different from one another and the first opaque pointer and second opaque pointer are both generated by the same library process on the same data processing system; and
    returning to the client process the second opaque pointer.

12. The method as in claim 11 wherein the encoding of the second opaque pointer comprises deriving a representation of text of executable code in the library process and using the representation of text as a variable in the encoding of the second opaque pointer.

13. The method as in claim 11 wherein the encoding of the second opaque pointer comprises obtaining a representation of text of executable code in the client process and using the representation of text as a variable in the encoding of the second opaque pointer.

14. The method as in claim 11 wherein the first opaque pointer is created in an encoding process by the library process.

15. The method as in claim 11 wherein the encoding of the second opaque pointer comprises performing a series of encoding operations in which an output from one encoding operation is used as an input to a next encoding operation.

16. The method as in claim 11 wherein the encoding of the second opaque pointer comprises using one or more constants in executable code in the library process as variables in the encoding of the second opaque pointer.

17. The method as in claim 11 wherein the encoding of the second opaque pointer comprises using a representation of a pointer value, corresponding to the first address, as a variable in the encoding of the second opaque pointer.

18. The method as in claim 11 wherein the encoding of the second opaque pointer comprises using a representation of the processed data structure as a variable in the encoding of the second opaque pointer.

19. The method as in claim 11 wherein the encoding of the second opaque pointer comprises calculating an encryption function with a key and variables, wherein the variables comprise a representation of text of executable code in the library process and a representation of the processed data structure; and wherein the key is a concatenation of a representation of selected text of executable code in the library process and a representation of the pointer value.

20. The method as in claim 19 wherein the representation of text is randomly selected, and wherein the encoding is nondeterministic and dynamic.

21. A data processing system comprising:
means for receiving, at a library process, a first encoded opaque pointer from a client process;
means for decoding, in the library process, the first encoded opaque pointer to derive a first address in memory for data in a data structure;
means for processing, in the library process, the data structure to create a processed data structure;
means for generating and encoding, in the library process, a second opaque pointer to reference the processed data structure, wherein the first opaque pointer and second opaque pointer are different from one another and the first opaque pointer and second opaque pointer are both generated by the same library process on the same data processing system; and
means for returning to the client process the second opaque pointer.

22. The medium as in claim 1, wherein the first opaque pointer references data in the data structure, and the second opaque pointer references the processed data structure, and first and second opaque pointers have different encodings.

23. The medium as in claim 1, wherein the second opaque pointer points to a different memory location than the first opaque pointer.

24. The medium as in claim 1 wherein the encoding of the second opaque pointer comprises calculating an encryption function with a key and variables, wherein the variables comprise at least two of: (a) a representation of text of executable code in the library process, (b) one or more constants in the executable code, or (c) a representation of the processed data structure; and wherein the key is a concatenation of a representation of selected text of executable code in the library process and a representation of the pointer value.

25. The method as in claim 11 wherein the encoding of the second opaque pointer comprises calculating an encryption function with a key and variables, wherein the variables comprise at least two of: (a) a representation of text of executable code in the library process, (b) one or more constants in the executable code, or (c) a representation of the processed data structure; and wherein the key is a concatenation of a representation of selected text of executable code in the library process and a representation of the pointer value.

* * * * *